(12) United States Patent
Takatsudo et al.

(10) Patent No.: US 8,766,816 B2
(45) Date of Patent: Jul. 1, 2014

(54) SYSTEM FOR MONITORING THE AREA AROUND A VEHICLE

(75) Inventors: Izumi Takatsudo, Saitama (JP); Nobuharu Nagaoka, Saitama (JP); Makoto Aimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 13/124,253

(22) PCT Filed: Jun. 24, 2009

(86) PCT No.: PCT/JP2009/002898
§ 371 (c)(1),
(2), (4) Date: Apr. 14, 2011

(87) PCT Pub. No.: WO2010/050090
PCT Pub. Date: May 6, 2010

(65) Prior Publication Data
US 2011/0199197 A1     Aug. 18, 2011

(30) Foreign Application Priority Data

Oct. 30, 2008   (JP) ................................. 2008-279879

(51) Int. Cl.
*B60Q 1/00*        (2006.01)
*G05B 23/02*       (2006.01)
*G06F 17/10*       (2006.01)

(52) U.S. Cl.
USPC ....... 340/903; 340/425.5; 340/436; 340/3.41; 701/301

(58) Field of Classification Search
CPC ......... G08G 1/16; G08G 1/142; G08G 1/165; G08G 9/02; G08G 5/04; G08G 3/02
USPC ............... 340/903, 425.5, 436, 3.41; 701/301
See application file for complete search history.

(56) References Cited

U.S. PATENT DOCUMENTS

| | | | | |
|---|---|---|---|---|
| 5,646,612 A | * | 7/1997 | Byon | 340/903 |
| 6,388,580 B1 | * | 5/2002 | Graham | 340/903 |
| 7,468,933 B2 | * | 12/2008 | Sugiura et al. | 367/96 |
| 7,586,400 B2 | * | 9/2009 | Nagaoka et al. | 340/425.5 |
| 7,650,239 B2 | * | 1/2010 | Samukawa et al. | 701/300 |

(Continued)

FOREIGN PATENT DOCUMENTS

| | | |
|---|---|---|
| JP | 2001-006096 A | 1/2001 |
| JP | 2007-188417 A | 7/2007 |
| JP | 2007-328603 A | 12/2007 |

(Continued)

*Primary Examiner* — George Bugg
*Assistant Examiner* — Munear Akki
(74) *Attorney, Agent, or Firm* — Carrier Blackman & Associates, P.C.; Joseph P. Carrier; Jeffrey T. Gedeon

(57) ABSTRACT

A system 1 for monitoring the area around a vehicle of the present invention capable of visually notifying the passenger in the vehicle 10 of not only the presence but also the kind of an object in images around the vehicle displayed in an HUD 7, for example, according to a difference in the display mode of the presence of the object, wherein the driver of the vehicle 10 is able to recognize which of a human or a four-footed animal the object belongs to, according to either a difference in the design between a first mark M1 and a second mark M2 or a difference in the design between a first frame F1 and a second frame F2 displayed on the HUD 7.

4 Claims, 4 Drawing Sheets

(56) References Cited

U.S. PATENT DOCUMENTS

| | | | |
|---|---|---|---|
| 7,667,581 B2* | 2/2010 | Fujimoto | 340/436 |
| 8,082,101 B2* | 12/2011 | Stein et al. | 701/301 |
| 8,199,046 B2* | 6/2012 | Nanami | 342/52 |
| 2002/0135469 A1* | 9/2002 | Nakamura et al. | 340/436 |
| 2008/0024325 A1* | 1/2008 | Kobayashi et al. | 340/939 |
| 2009/0027180 A1* | 1/2009 | Shibata et al. | 340/435 |

FOREIGN PATENT DOCUMENTS

| | | |
|---|---|---|
| JP | 2008-021035 A | 1/2008 |
| JP | 2008-071058 A | 3/2008 |
| JP | 2008-271035 A | 11/2008 |

\* cited by examiner

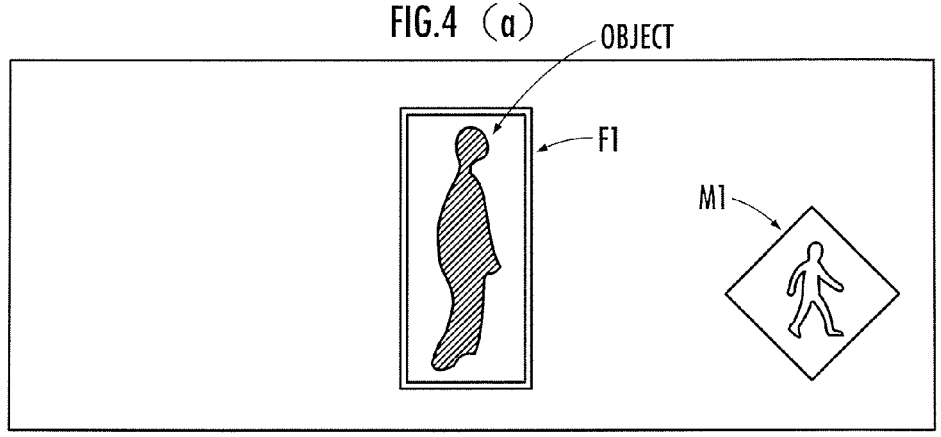
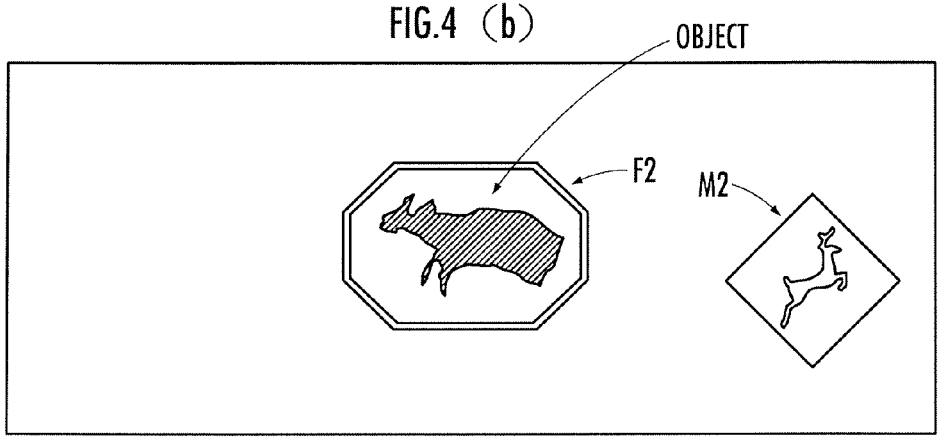
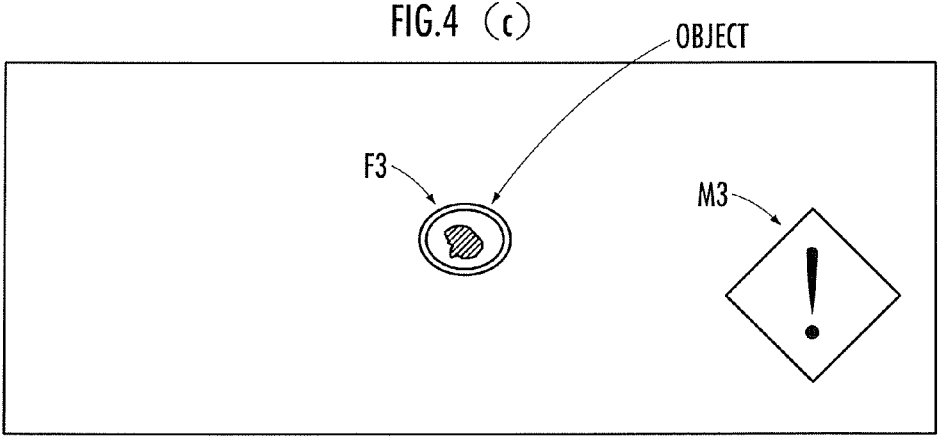

SYSTEM FOR MONITORING THE AREA AROUND A VEHICLE

TECHNICAL FIELD

The present invention relates to a system for monitoring the area around a vehicle, which uses a captured image taken by an imaging device mounted on the vehicle, so that a notifying device notifies a passenger in the vehicle of the presence of an object in the case of high contacting possibility between the vehicle and the object.

BACKGROUND ART

There has been suggested a system for monitoring the area around a vehicle, which calculates a motion vector in the real space of an object on the basis of time-series positional data of the object such as an animal existing in the area around the vehicle, decides whether the contacting possibility between the vehicle and the object is high or low on the basis of the motion vector, and notifies the driver that the contacting possibility is high if decided so (Refer to Japanese Patent Application Laid-Open No. 2001-006096).

DISCLOSURE OF THE INVENTION

Problem to be Solved by the Invention

Meanwhile, although the kind of an object is useful information for the driver of a vehicle when the driver recognizes that the object is a human, such as a pedestrian or a passenger on a bicycle, or a four-footed animal such as a deer or a dog, the driver is not able to recognize the kind of the object only with simple notification.

Therefore, it is an object of the present invention to provide a system for monitoring the area around a vehicle capable of notifying the passenger in the vehicle of the presence of an object so that the passenger is able to recognize the kind of the object.

Means for Solving the Problem

To solve the above problem, the present invention provides a system for monitoring the area around a vehicle, which uses a captured image taken by an imaging device mounted on the vehicle, so that an notification device notifies a passenger in the vehicle of the presence of an object in the case of high contacting possibility between the vehicle and the object, the system including: an object extracting unit, which extracts an image area corresponding to the object as an object area from the captured image; an object kind deciding unit, which decides which of a human or a four-footed animal the object belongs to on the basis of the shape and size of the object area extracted by the object extracting unit; and a notification control unit, which causes the notification device to give notification on the presence of the object in a different mode according to a difference in the kind of the object decided by the object kind deciding unit.

The system for monitoring the area around a vehicle of the present invention further includes a distance measuring unit, which measures a distance between the vehicle and the object. The object kind deciding unit decides the kind of the object with a requirement that the distance measured by the distance measuring unit is a reference distance or less, and the notification control unit causes the notification device to give notification on the presence of the object by a first notification process in the case where it is decided that the kind of the object belongs to a human, while causing the notification device to give notification on the presence of the object by a second notification process, which is different from the first notification process, in the case where it is decided that the kind of the object belongs to a four-footed animal. The object kind deciding unit not make decision on the kind of the object with a requirement that the distance is longer than the reference distance, and the notification control unit causes the notification device to give notification on the presence of the object by a third notification process, which is different from each of the first notification process and the second notification process.

According to the system for monitoring the area around a vehicle of the present invention, the passenger in the vehicle is able to recognize not only the presence but also the kind of the object according to a difference in the mode of notification indicating the presence of the object. Here, the "captured image" is a concept including not only a captured original image itself but also a processed image obtained by processing the original image. Moreover, in view of the fact that the farther the object is from the vehicle, the lower the decision accuracy of the kind of the object is, the driver of the vehicle is notified of the presence of the object in a different mode according to a difference in the kind of the object only in a state where the decision accuracy is high to some extent. This prevents a situation where an erroneous decision on the kind of the object obtained by the system for monitoring the area around a vehicle causes the driver to be notified of the presence of the object in a wrong mode. Further, the passenger in the vehicle is able to recognize not only the presence and kind of the object but also the degree of the distance between the vehicle and the object according to a difference in the mode of the notification indicating the presence of the object.

The system for monitoring the area around a vehicle of the present invention may include a vehicle speed measuring unit, which measures the speed of the vehicle, so that the notification control unit causes the notification device to give notification on the presence of the object in a different mode according to not only a difference in the kind of the object decided by the object kind deciding unit but also the level of the speed of the vehicle measured by the vehicle speed measuring unit.

According to the system for monitoring the area around a vehicle of the present invention, the passenger in the vehicle is able to recognize not only the presence and kind of the object but also the level of the speed of the vehicle according to a difference in the mode of the notification indicating the presence of the object.

The system for monitoring the area around a vehicle of the present invention may include an image display device, which displays images around the vehicle, as the notification device, so that the image display device displays the presence of the object in a different mode according to a difference in the kind of the object decided by the object kind deciding unit.

According to the system for monitoring the area around a vehicle of the present invention, the passenger in the vehicle is able to be visually notified of not only the presence but also the kind of the object in images around the vehicle, according to a difference in the display mode of the presence of the object.

The system for monitoring the area around a vehicle of the present invention may include a sound output device, which outputs a sound indicating the presence of the object, as the notification device, so that the sound output device outputs the sound indicating the presence of the object in a different mode according to a difference in the does kind of the object decided by the object kind deciding unit.

According to the system for monitoring the area around a vehicle of the present invention, the passenger in the vehicle is able to aurally recognize not only the presence but also the kind of the object according to a difference in the output mode of a sound indicating the presence of the object.

According to the system for monitoring the area around a vehicle of the present invention, the passenger in the vehicle is able to recognize not only the presence but also the kind of the object according to a difference in the mode of notification indicating the presence of the object. Here, the "captured image" is a concept including not only a captured original image itself but also a processed image obtained by processing the original image.

The system for monitoring the area around a vehicle of the present invention may include an image display device, which displays images around the vehicle, as the notification device, so that the image display device displays the presence of the object in a different mode according to a difference in the kind of the object decided by the object kind deciding unit.

According to the system for monitoring the area around a vehicle having the configuration, the passenger in the vehicle is able to be visually notified of not only the presence but also the kind of the object in images around the vehicle, according to a difference in the display mode of the presence of the object.

The system for monitoring the area around a vehicle of the present invention may include a sound output device, which outputs a sound indicating the presence of the object, as the notification device, so that the sound output device outputs the sound indicating the presence of the object in a different mode according to a difference in the kind of the object decided by the object kind deciding unit.

According to the system for monitoring the area around a vehicle having the configuration, the passenger in the vehicle is able to aurally recognize not only the presence but also the kind of the object according to a difference in the output mode of a sound indicating the presence of the object.

The system for monitoring the area around a vehicle of the present invention may include a distance measuring unit, which measures a distance between the vehicle and the object, so that the notification control unit causes the notification device to give notification on the presence of the object in a different mode according to a difference in the kind of the object with a requirement that the distance measured by the distance measuring unit is a reference distance or less.

According to the system for monitoring the area around a vehicle having the configuration, in view of the fact that the farther the object is from the vehicle, the lower the decision accuracy of the kind of the object is, the driver of the vehicle is notified of the presence of the object in a different mode according to a difference in the kind of the object only in a state where the decision accuracy is high to some extent. This prevents a situation where an erroneous decision on the kind of the object obtained by the system for monitoring the area around a vehicle causes the driver to be notified of the presence of the object in a wrong mode.

The system for monitoring the area around a vehicle according to the present invention may include a distance measuring unit, which measures a distance between the vehicle and the object, so that the notification control unit causes the notification device to give notification on the presence of the object in a different mode according to not only a difference in the kind of the object decided by the object kind deciding unit but also the degree of the distance measured by the distance measuring unit.

According to the system for monitoring the area around a vehicle having the configuration, the passenger in the vehicle is able to recognize not only the presence and kind of the object but also the degree of the distance between the vehicle and the object according to a difference in the mode of the notification indicating the presence of the object.

The system for monitoring the area around a vehicle of the present invention may include a vehicle speed measuring unit, which measures the speed of the vehicle, so that the notification control unit causes the notification device to give notification on the presence of the object in a different mode according to not only a difference in the kind of the object decided by the object kind deciding unit but also the level of the speed of the vehicle measured by the vehicle speed measuring unit.

According to the system for monitoring the area around a vehicle having the configuration, the passenger in the vehicle is able to recognize not only the presence and kind of the object but also the level of the speed of the vehicle according to a difference in the mode of the notification indicating the presence of the object.

BRIEF DESCRIPTION OF THE DRAWINGS

FIG. 4 is an explanatory diagram of different notification processes.

BEST MODE FOR CARRYING OUT THE INVENTION

Preferred embodiments of a system for monitoring the area around a vehicle of the present invention will be described below.

Figure 1:
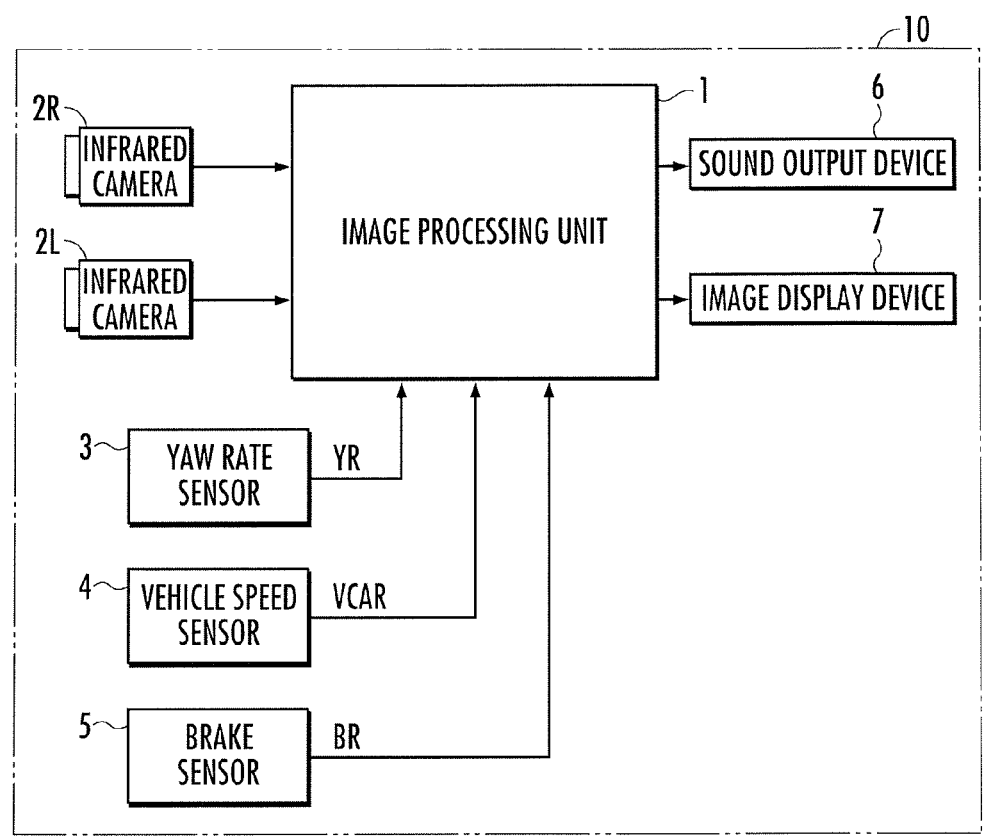
FIG. 1 is a configuration explanatory diagram of a system for monitoring the area around a vehicle according to the present invention.

First, the configuration of the system for monitoring the area around a vehicle of this embodiment will be described. The system for monitoring the area around a vehicle includes an image processing unit 1 illustrated in FIG. 1 and FIG. 2. The image processing unit 1 is connected to a pair of right and left infrared cameras 2R and 2L (corresponding to "the imaging device" of the present invention) which take images of the front of the vehicle 10, and the image processing unit 1 is connected to, as a sensor detecting the running condition of the vehicle 10, a yaw rate sensor 3 which detects the yaw rate of the vehicle 10, a vehicle speed sensor 4 which detects the running speed of the vehicle 10 (vehicle speed), and a brake sensor 5 which detects whether a brake operation of the vehicle 10 is performed.

Moreover, the image processing unit 1 is connected to a speaker (corresponding to "the sound output device" of the present invention) 6 for use in outputting auditory notification information with a sound or the like and a HUD (head-up display, corresponding to "the image display device" of the present invention) 7, which is placed in the vicinity of the front window in order to display captured images taken by the infrared cameras 2R and 2L and visual notification information.

If a distance from the object is measured by a radar, only one infrared camera may be mounted on the vehicle 10. Instead of or in addition to the HUD, a display that displays the running condition including the vehicle speed of the vehicle 10 or a display of the in-vehicle navigation device may be used as the image display device.

The image processing unit 1 is made of an ECU (electronic control unit) including an A-D converter, the CPU, memories such as a RAM and a ROM, I/O circuits, a bus for connecting these parts together. The image processing unit 1 (more specifically, the CPU, which performs arithmetic processing based on a program stored in a memory or a storage device) constitute "the object extracting unit", "the object kind deciding unit", and "the notification control unit" of the present invention.

The AD converter circuit digitizes analog signals output from the infrared cameras 2R and 2L, the yaw rate sensor 3, the vehicle speed sensor 4, and the brake sensor 5. Based on the digitized data, the CPU detects an object such as a human (a pedestrian or a passenger on a bicycle or on a two-wheel motor vehicle) or a four-footed animal (a deer, a horse, a dog, or the like) and notifies the driver of the presence of the object or the level of contacting possibility between the vehicle 10 and the object through the speaker 6 or the HUD 7 if the detected object satisfies a predetermined notification requirement.

Figure 2:
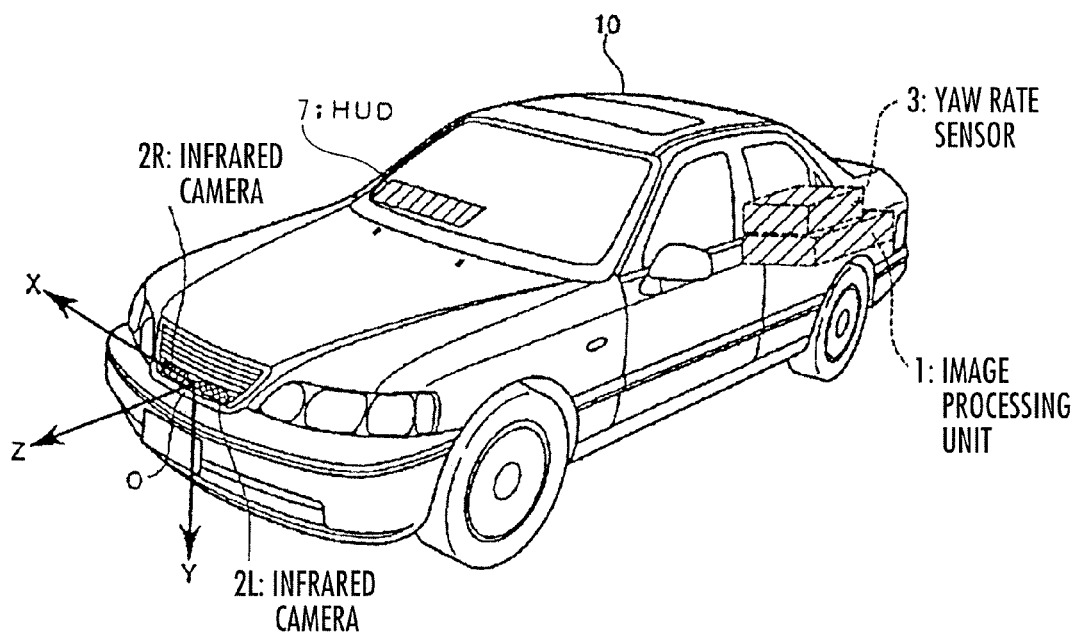
FIG. 2 is an explanatory diagram of the vehicle mounted with the system for monitoring the area around a vehicle.

As illustrated in FIG. 2, the infrared cameras 2R and 2L are fitted to the front part (a portion of the front grille in FIG. 2) of the vehicle 10 to take images of the front of the vehicle 10. The right infrared camera 2R is placed to the right from the center in the vehicle width direction of the vehicle 10, and the left infrared camera 2L is placed to the left from the center in the vehicle width direction of the vehicle 10. Their positions are symmetrical to the center in the vehicle width direction of the vehicles 10. The infrared cameras 2R and 2L are fixed so that the optical axes extend in the front-rear direction of the vehicle 10 in parallel to each other and the optical axes have the same height from the road surface. The infrared cameras 2R and 2L have sensitivity in a far-infrared region and have characteristics that the higher the temperature of a thing imaged by the infrared cameras 2R and 2L is, the higher the level of output video signals is (the higher the luminance of the video signals is).

The following describes the functions of the system for monitoring the area around a vehicle having the above configuration. The image processing is disclosed in detail in Japanese Patent Application Laid-Open No. 2001-006096 and Japanese Patent Application Laid-Open No. 2007-310705 and therefore briefly described below.

First, the infrared image signals of the infrared cameras 2R and 2L are input to the image processing unit 1, the infrared image signals are AD-converted, gray-scale images are generated on the basis of the AD-converted infrared image signals, and a reference gray-scale image (right image) is binarized. Thereafter, the area where the object exists in the binary image is extracted as an object area S (STEP 002 of FIG. 3).

Specifically, pixels constituting a high-luminance area of the binary image are converted to run length data, a label (an identifier) is attached to each of the lines having overlapping in the vertical direction of the reference image, and each of the lines is extracted as the object area S. This enables an extraction of the high-luminance area, which is made of a group of high-luminance pixels (pixels having a pixel value of 1) as illustrated with diagonal lines in FIGS. 4(*a*) to 4(*c*), as the object area S.

Subsequently, a calculation is made on the center-of-gravity position (the position on the reference image), the planar dimensions, and the aspect ratio of a circumscribed quadrangle of each object. Further, the object is tracked at time intervals 25 to decide the identity of the object over the respective arithmetic processing cycles of the image processing unit 1. Moreover, outputs from the vehicle speed sensor 4 and the yaw rate sensor 3 (the detected value of the vehicle speed and the detected value of the yaw rate) are read.

Further, in parallel with the calculation of the aspect ratio of the circumscribed quadrangle and the tracking of the object at time intervals, the area corresponding to each object (for example, the area of the circumscribed quadrangle of the object) is extracted as a search image from the reference image. Moreover, the correlation operation is performed to search for and extract the image corresponding to the search image (the corresponding image) from the left image.

Figure 3:
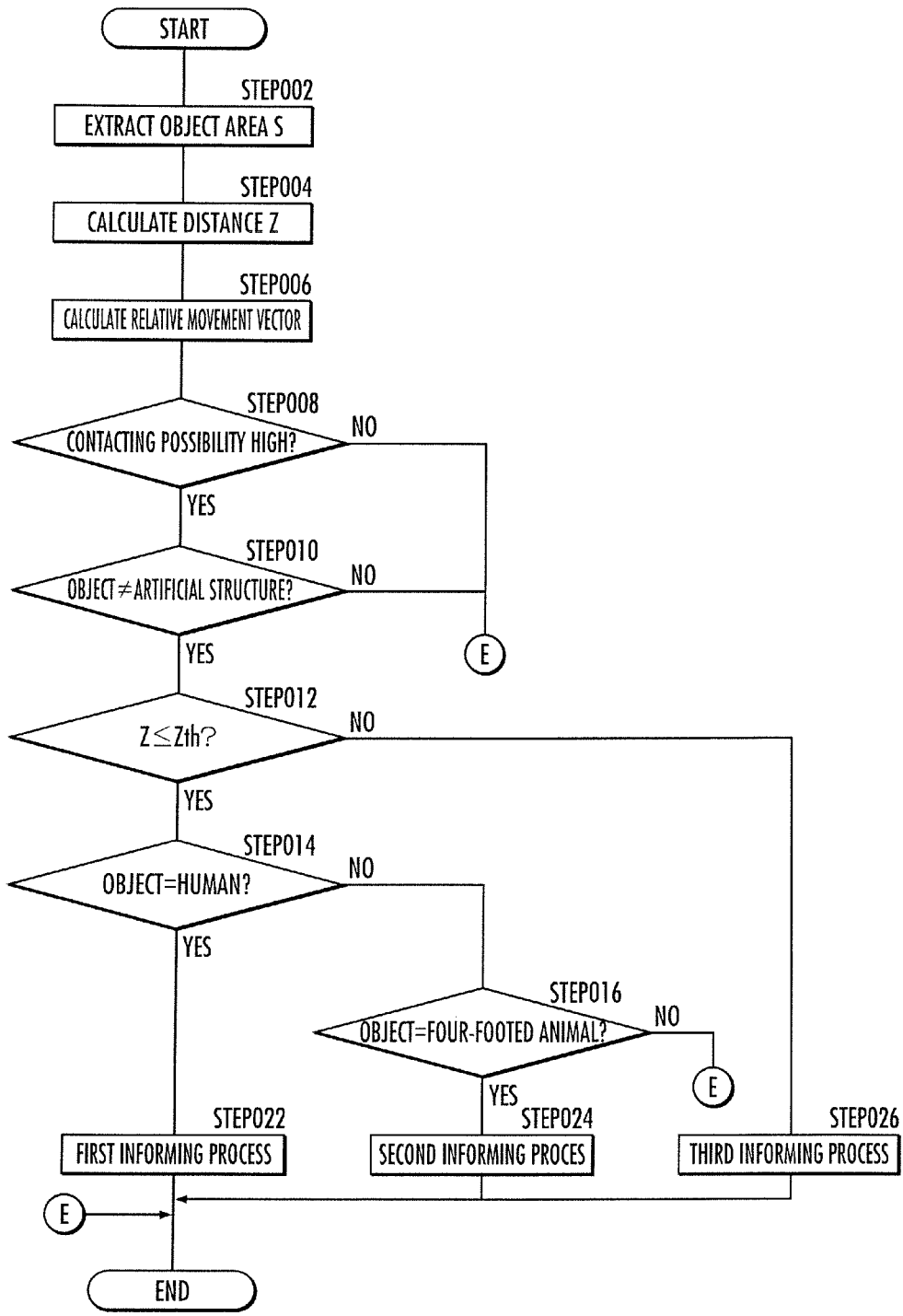
FIG. 3 is a flowchart illustrating the functions of the system for monitoring the area around a vehicle.

Further, a real space distance (a distance in the front-rear direction of the vehicle 10) z from the vehicle 10 to the object is calculated (STEP 004 of FIG. 3). Moreover, the real space position (a relative position to the vehicle 10) of each object is calculated. Furthermore, the X component of the real space position (X, Y, Z) (See FIG. 2) of the object is corrected according to the time-series data of a heading angle. Further, the relative motion vector of the object to the vehicle 10 is calculated (STEP 006 of FIG. 3).

Further, the level of contacting possibility between the vehicle 10 and the object is decided (STEP 008 of FIG. 3). This decision method is also disclosed in Japanese Patent Application Laid-Open No. 2001-006096 and Japanese Patent Application Laid-Open No. 2007-310705 and therefore briefly described below.

First, it is decided whether the real space distance z of the object is not greater than a multiplication value between a relative speed Vs and an allowance time T. If the real space distance z is decided to be not greater than the value, it is then decided whether the object exists in a closing object decision area (a first contact decision process).

The closing object decision area spreads symmetrically in the right-left direction of the vehicle 10 ahead thereof, having a width obtained by adding an offset value to the width of the vehicle 10. If the decision result of the first contact decision process is affirmative, it is decided that the object is likely to come in contact with the vehicle 10.

Meanwhile, if the decision result of the first contact decision process is negative, it is further decided whether the object exists in an approaching object decision area that is outside the closing object decision area and the relative motion vector of the object is directed to the closing object decision area (a second contact decision process). If the decision result of the second contact decision process is affirmative, it is decided that the object is likely to come in contact with the vehicle 10.

If it is decided that the contacting possibility between the vehicle 10 and the object is high (if the decision result of the first or second contact decision process is affirmative) (YES in STEP 008 of FIG. 3), it is decided whether the object is a thing that is low in necessity for notifying the driver of the presence of the thing such as an artificial structure and the like (STEP 010 of FIG. 3). For example, if an external feature indicating that the object can be neither a pedestrian nor a four-footed animal is detected in the object, the object is decided to be an artificial structure.

If it is decided that the contacting possibility between the vehicle 10 and the object is low (if the decision results of the first and second contact decision processes are negative) (NO in STEP 008 of FIG. 3) or if it is decided that the object is not a target of notifying the driver (NO in STEP 010 of FIG. 3), processes subsequent to the extraction of the object area S are repeated without performing notification process described later (See STEP 002 and the like of FIG. 3).

If it is decided that the object is not an artificial structure (YES in STEP 010 of FIG. 3), it is decided whether the real space distance z of the object is not greater than a threshold zth (STEP 012 of FIG. 3). The threshold zth is set in the light of the level of the decision accuracy of the kind of the object. If the real space distance z of the object is decided to be not greater than the threshold zth (YES in STEP 012 of FIG. 3), it is decided whether the object is a human such as a pedestrian or a passenger on a bicycle (STEP 014 of FIG. 3).

If the object is decided not to be a human (NO in STEP 014 of FIG. 3), it is decided whether the object is a four-footed animal such as a deer, a horse, or a dog (STEP 016 of FIG. 3). Specifically, it is decided whether the object is a human or a four-footed animal on the basis of the shape or size of the object area S or a feature quantity such as a luminance distribution on the gray scale image.

If the object is decided to be a human (YES in STEP 014 of FIG. 3), a "first notification process" is performed (STEP 022 of FIG. 3). Thereby, three short sounds like "pi-pi-pi" are continuously output from the speaker 6. Moreover, as illustrated in FIG. 4(*a*), a first frame F1 that has a rectangular shape enclosing the object and a first mark M1 indicating that the object is a human are displayed on the HUD 7.

Further, if the object is decided to be a four-footed animal (YES in STEP 016 of FIG. 3), a "second notification process" is performed (STEP 024 of FIG. 3). Thereby, two short sounds like "pi-pi" are continuously output from the speaker 6. Moreover, as illustrated in FIG. 4(*b*), a second frame F2 that has an octagonal shape enclosing the object and a second mark M2 indicating that the object is a four-footed animal are displayed on the HUD 7.

Still further, if it is decided that the real space distance z of the object exceeds the threshold zth (NO in STEP 012 of FIG. 3), a "third notification process" is performed (STEP 026 of FIG. 3). Thereby, only one short sound like "pi" is output from the speaker 6. Moreover, as illustrated in FIG. 4(*c*), a third frame F3 that has a circular shape enclosing the object and a third mark M3 indicating that the object is a thing such as a human or a four-footed animal having high contacting possibility with the vehicle 10 are displayed on the HUD 7.

The first frame F1 to the third frame F3 have different designs (the design means the shape, color, pattern, or the combination thereof) from each other. Also, the first mark M1 to the third mark M3 have different designs from each other. The sounds output in the notification processes are different from each other, too. In each notification process, only one of the mark and the frame may be displayed and only one of the image and the sound may be output instead of both thereof.

According to the system for monitoring the area around a vehicle having the above functions, the passenger in the vehicle 10 is able to recognize not only the presence but also the kind of the object according to a difference in the mode of the notification indicating the presence of the object (see STEP 022 and STEP 024 of FIG. 3). Thus, the passenger in the vehicle is able to aurally recognize not only the presence but also the kind of the object according to a difference in the output mode of a sound indicating the presence of the object output from the speaker 6.

For example, the driver of the vehicle 10 is able to recognize which of a human or a four-footed animal the object belongs to according to a difference in the sound output from the speaker 6. Moreover, the passenger in the vehicle 10 is able to be visually notified of not only the presence but also the kind of the object in images around the vehicle displayed on the HUD 7, according to a difference in the display mode of the presence of the object. For example, it is possible to cause the driver of the vehicle 10 to recognize which of a human or a four-footed animal the object belongs to, according to a difference in the design between the first mark M1 and the second mark M2 or a difference in the design between the first frame F1 and the second frame F2 displayed on the HUD 7 (See FIG. 4(*a*) and FIG. 4(*b*)).

Further, in view of the fact that the farther the object is from the vehicle 10, the lower the decision accuracy of the kind of the object is, the driver of the vehicle 10 is notified of the presence of the object in a different mode according to a difference in the kind of the object only in a state where the decision accuracy is high to some extent, that is, only in a case where the real space distance z of the object is not greater than the threshold zth (See STEP 012 of FIG. 3 and FIG. 4(*a*) to FIG. 4(*c*)).

This prevents a situation where an erroneous decision on the kind of the object obtained by the system 1 for monitoring the area around a vehicle causes the driver to be notified of the presence of the object in a wrong mode. Note, however, that, also when the real space distance z of the object exceeds the threshold zth, the driver is notified of the presence of the object (See STEP 026 of FIG. 3 and FIG. 4(*c*)) and therefore the driver's attention can be called to the object.

Moreover, the driver may be notified of the presence of the object in a different mode according to not only a difference in the kind of the object but also the degree of the real space distance z. Also when the real space distance z of the object exceeds the threshold zth, the decision may be made on the kind of the object.

Instead of using the threshold zth, the decision may be made on the degree of a distance from the vehicle 10 to the object according to whether the real space distance z is not greater than a second threshold that is smaller than the threshold zth. For example, while it is decided that the object is a human (See STEP 014 of FIG. 3), the HUD 7 may display marks different in design between the cases of a short real space distance z of the object and a long real space distance z of the object. According to the configuration, it is possible to cause the driver to recognize not only the presence and kind of the object but also the degree of the distance between the vehicle 10 and the object according to a difference in the mode of the notification indicating the presence of the object.

Further, the driver may be notified of the presence of the object in a different mode according to a difference in the kind of the object on condition that the size of the object in the captured image exceeds a predetermined threshold, instead of using the distance to the object.

Moreover, the driver may be notified of the presence of the object in a different mode according to not only a difference in the kind of the object but also the level of the speed of the vehicle 10 measured with an output signal from the vehicle speed sensor 4. According to the configuration, it is possible to cause the driver to recognize not only the presence and kind of the object but also the level of the speed of the vehicle 10 according to a difference in the mode of the notification indicating the presence of the object.

The invention claimed is:

1. A system for monitoring the area around a vehicle, which uses a captured image taken by an imaging device mounted on the vehicle, so that an notification device notifies a passenger in the vehicle of the presence of an object in the case of high contacting possibility between the vehicle and the object, the system comprising:
    an object extracting unit, which extracts an image area corresponding to the object as an object area from the captured image;
    an object kind deciding unit, which decides which of a human or a four-footed animal the object belongs to on the basis of the shape and size of the object area extracted by the object extracting unit;

a notification control unit, which causes the notification device to give notification on the presence of the object in a different mode according to a difference in the kind of the object decided by the object kind deciding unit; and a distance measuring unit, which measures a distance between the vehicle and the object, wherein the object kind deciding unit decides whether to identify the object based on the distance between the vehicle and the object such that:

the object kind deciding unit decides the kind of the object with a requirement that the distance measured by the distance measuring unit is a reference distance or less, so that the notification control unit causes the notification device to give notification on the presence of the object by a first notification process in the case where it is decided that the kind of the object belongs to a human, while causing the notification device to give notification on the presence of the object by a second notification process, which is different from the first notification process, in the case where it is decided that the kind of the object belongs to a four-footed animal; and the object kind deciding unit does not make decision on the kind of the object with a requirement that the distance is longer than the reference distance, so that the notification control unit causes the notification device to give notification on the presence of the object by a third notification process, which is different from each of the first notification process and the second notification process.

2. The system for monitoring the area around a vehicle according to claim 1, further comprising a vehicle speed measuring unit, which measures the speed of the vehicle, wherein the notification control unit causes the notification device to give notification on the presence of the object in a different mode according to not only a difference in the kind of the object decided by the object kind deciding unit but also the level of the speed of the vehicle measured by the vehicle speed measuring unit.

3. The system for monitoring the area around a vehicle according to claim 1, further comprising an image display device, which displays images around the vehicle, as the notification device, wherein the image display device displays the presence of the object in a different mode according to a difference in the kind of the object decided by the object kind deciding unit.

4. The system for monitoring the area around a vehicle according to claim 1, further comprising a sound output device, which outputs a sound indicating the presence of the object, as the notification device, wherein the sound output device outputs the sound indicating the presence of the object in a different mode according to a difference in the kind of the object decided by the object kind deciding unit.

* * * * *